US009642205B2

(12) United States Patent
Jang et al.

(10) Patent No.: US 9,642,205 B2
(45) Date of Patent: May 2, 2017

(54) BACKLIGHT UNIT WITH AUTOMATIC AND REAL TIME CORRECTION OF CURRENT DRIVING LEVEL

(71) Applicant: Samsung Display Co., Ltd., Yongin-si, Gyeonggi-Do (KR)

(72) Inventors: Jinwon Jang, Asan-si (KR); Jintaek Hong, Asan-si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/825,837

(22) Filed: Aug. 13, 2015

(65) Prior Publication Data

US 2016/0183342 A1    Jun. 23, 2016

(30) Foreign Application Priority Data

Dec. 18, 2014  (KR) .................. 10-2014-0183378

(51) Int. Cl.
*H05B 33/08*    (2006.01)

(52) U.S. Cl.
CPC ....... *H05B 33/0851* (2013.01); *H05B 33/086* (2013.01); *Y02B 20/347* (2013.01)

(58) Field of Classification Search
CPC ................................ H05B 33/0851
USPC ...................................... 315/307
See application file for complete search history.

(56) References Cited

U.S. PATENT DOCUMENTS

| 8,344,659 | B2 | 1/2013 | Shimomura et al. |
| 8,350,496 | B2 | 1/2013 | Peting et al. |
| 8,350,497 | B2 | 1/2013 | Peting et al. |
| 8,456,098 | B2 | 6/2013 | Peting et al. |
| 8,569,965 | B2 | 10/2013 | Uchimoto et al. |
| 8,823,281 | B2 | 9/2014 | Peting et al. |
| 8,890,434 | B2 | 11/2014 | Shimomura et al. |
| 9,107,257 | B2 | 8/2015 | Jayabalan et al. |
| 2010/0315572 | A1* | 12/2010 | Locascio ............ H05B 33/0824 349/61 |
| 2011/0128303 | A1* | 6/2011 | Yonemaru .......... H05B 33/0827 345/690 |
| 2011/0148323 | A1* | 6/2011 | Yao .................... H05B 33/0827 315/295 |

(Continued)

FOREIGN PATENT DOCUMENTS

| KR | 10-2008-0079775 A | 9/2008 |
| KR | 10-2012-0064636 A | 6/2012 |

(Continued)

*Primary Examiner* — Dylan White
(74) *Attorney, Agent, or Firm* — Robert E. Bushnell, Esq.

(57) ABSTRACT

A backlight unit capable of substantially reducing a change in a level of a driving current includes: a light source; a static current switching element connected between the light source and a sensing node and controlling a driving current supplied to the light source; a sensing resistor connected between the sensing node and a ground; a static current controller controlling an operation of the static current switching element based on a sensing voltage from the sensing node and an externally supplied driving current control signal; and a driving current corrector generating the driving current control signal and correcting a level of the driving current control signal based on the sensing voltage.

10 Claims, 9 Drawing Sheets

(56) References Cited

U.S. PATENT DOCUMENTS

| | | |
|---|---|---|
| 2012/0074778 A1 | 3/2012 | Shimomura et al. |
| 2012/0074847 A1 | 3/2012 | Shimomura et al. |
| 2012/0074918 A1 | 3/2012 | Shimomura et al. |
| 2012/0075544 A1* | 3/2012 | Sasaki ............... G02F 1/133603 349/42 |
| 2012/0098328 A1 | 4/2012 | Shimomura et al. |
| 2013/0099684 A1* | 4/2013 | Cheng ............... H05B 33/0818 315/186 |
| 2013/0278176 A1 | 10/2013 | Shimomura et al. |
| 2014/0145626 A1* | 5/2014 | Choi ............... H05B 33/0815 315/186 |
| 2016/0143103 A1* | 5/2016 | Kang ............... H05B 33/0815 315/210 |

FOREIGN PATENT DOCUMENTS

| | | |
|---|---|---|
| KR | 20-2012-0007710 U | 11/2012 |
| KR | 10-2013-0081637 A | 7/2013 |
| KR | 10-2013-0132997 A | 12/2013 |

* cited by examiner

BACKLIGHT UNIT WITH AUTOMATIC AND REAL TIME CORRECTION OF CURRENT DRIVING LEVEL

CLAIM OF PRIORITY

This application claims the priority to and all the benefits accruing under 35 USC §119 of Korean Patent Application No. 10-2014-0183378, filed on Dec. 18, 2014, with the Korean Intellectual Property Office (KIPO), the disclosure of which is incorporated herein in its entirety by reference.

BACKGROUND OF THE INVENTION

1. Field of Disclosure

Embodiments of the present invention relate to a backlight unit capable of substantially reducing a fluctuation in a level of a driving current.

2. Description of the Related Art

Liquid crystal display (LCD) devices utilize liquid crystal molecules, which are non-light-emitting elements, and thus, a backlight unit is required therein to produce light.

Such backlight unit includes a plurality of light emitting diodes (LEDs). LEDs emit light based on a driving current. The driving current is controlled based on a driving current control signal. The driving current control signal is determined by a plurality of resistors and capacitors. When a target level of a driving current is set, a plurality of resistors are selected based on the set target level of the driving current to be provided in the backlight unit. However, in a case in which a level of the resistor largely deviates from a tolerance level, a level of the driving current may largely deviate from the target level of the driving current. In this instance, the backlight unit is verified to be defective.

In general, rework is performed with respect to the backlight unit verified to be defective. That is, an operator corrects the driving current by changing a level of the resistor through a soldering process. However, such a soldering process according to related art may have the following issues. For instance, since an operator directly performs soldering, a period of operation time may be relatively long. In addition, changing a level of a resistor of a backlight unit which has undergone rework may be difficult.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY OF THE INVENTION

Aspects of embodiments of the present invention are directed to a backlight unit detecting a change in a level of a driving current in real time and automatically correcting a level of a resistor based on a result of the detection.

According to an exemplary embodiment, a backlight unit includes: a light source; a static current switching element connected between the light source and a sensing node and controlling a driving current supplied to the light source; a sensing resistor connected between the sensing node and a ground; a static current controller controlling an operation of the static current switching element based on a sensing voltage from the sensing node and an externally supplied driving current control signal; and a driving current corrector generating the driving current control signal and correcting a level of the driving current control signal based on the sensing voltage.

The driving current corrector may include: a control signal generator receiving an external input of a reference voltage and generating the driving current control signal; a first corrector comparing a level of the sensing voltage with a level of an upper limit reference voltage, and correcting a level of the driving current control signal output from the control signal generator based on a result of the comparison; and a second corrector comparing the level of the sensing voltage with a level of a lower limit reference voltage, and correcting a level of the driving current control signal output from the control signal generator based on a result of the comparison.

The control signal generator may include: a first resistor connected between a reference node to which the reference voltage is applied and an output terminal of the control signal generator; a second resistor connected between the output terminal of the control signal generator and a ground; and a first capacitor connected between the output terminal of the control signal generator and the ground.

The first corrector may include: a first control resistor connected to the output terminal of the control signal generator; a first comparator comparing the level of the sensing voltage with the level of the upper limit reference voltage, and outputting a first comparison signal based on a result of the comparison; and a first switching element controlled based on the first comparison signal from the first comparator, and connected between a reference node to which the reference voltage is applied and the first control resistor.

The first corrector may further include: a third resistor connected between an one end input terminal of the first comparator to which the upper limit reference voltage is applied and the reference node; and a fourth resistor connected between the one end input terminal of the first comparator and a ground.

The first corrector may further include a fifth resistor connected between the one end input terminal of the first comparator to which the upper limit reference voltage is applied and an output terminal of the first comparator.

The second corrector may include: a second control resistor connected to the output terminal of the control signal generator; a second comparator comparing the level of the sensing voltage with the level of the lower limit voltage, and outputting a second comparison signal based on a result of the comparison; a second switching element controlled based on the second comparison signal from the second comparator, and connected between a control node and a ground; and a third switching element controlled based on a voltage of the control node, and connected between the reference node and the second control resistor.

The second corrector may further includes: a sixth resistor connected between an one end input terminal of the second comparator to which the lower limit reference voltage is applied and the reference node; a seventh resistor connected between the reference node and an output terminal of the second comparator; and an eighth resistor connected between the reference node and the control node.

The second corrector may further include: a ninth resistor connected between the one end input terminal of the second comparator and a ground; a tenth resistor connected to the ground; and a fourth switching element controlled based on the second comparison signal from the second comparator, and connected between the one end terminal of the second comparator and the tenth resistor.

The backlight unit may further include an integrator connected between the sensing node and the driving current corrector.

The integrator may include: a diode connected between the sensing node and an input terminal of the driving current corrector; an eleventh resistor connected between the input terminal of the driving current corrector and a ground; and a second capacitor connected between the input terminal of the driving current corrector and the ground.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

In the drawings, thicknesses are illustrated in an enlarged manner in order to clearly describe a plurality of layers and areas. Like reference numbers are used to denote like elements throughout the specification. When an element or layer is referred to as being "on", "engaged to" or "connected to" another element or layer, it may be directly on, engaged or connected the other element or layer, or intervening elements or layers may be present. In contrast, when an element is referred to as being "directly on," "directly engaged to" or "directly connected to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Figure 1:
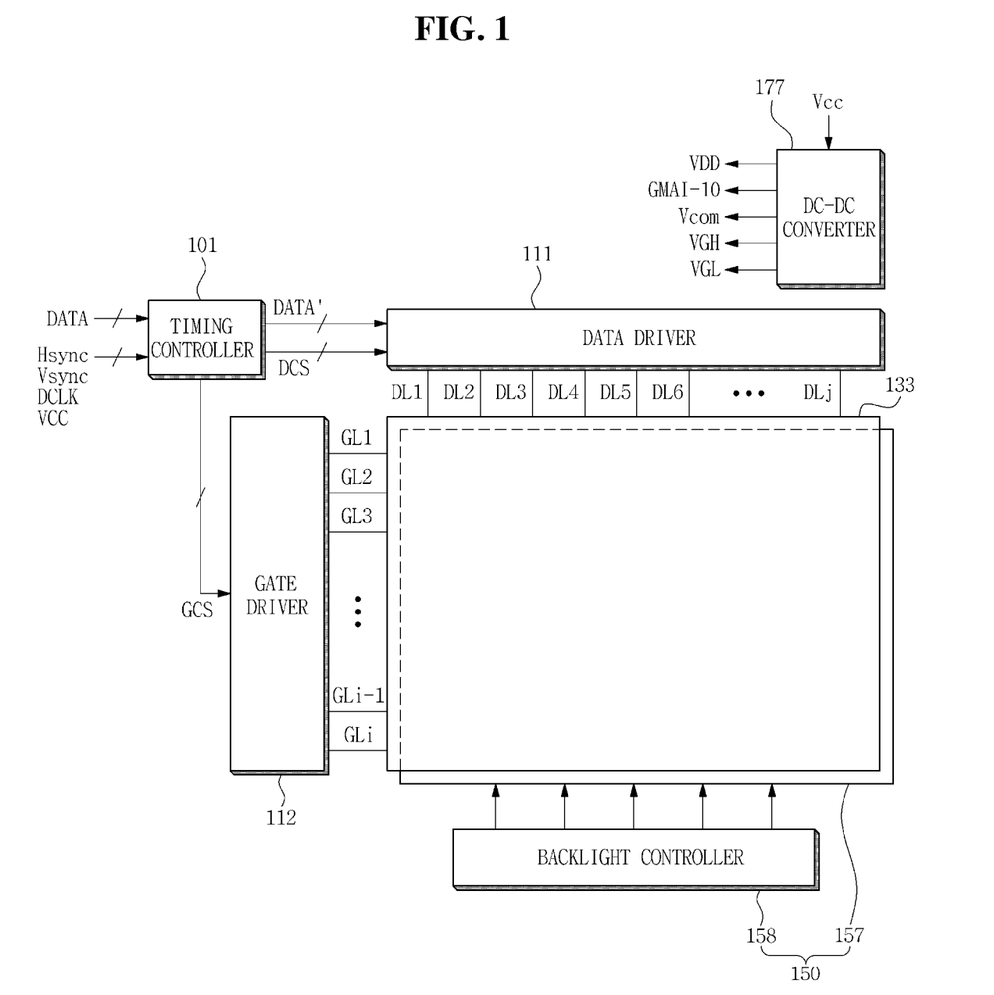
FIG. 1 is a block diagram illustrating a display device according to an exemplary embodiment of the present invention.
Figure 2:
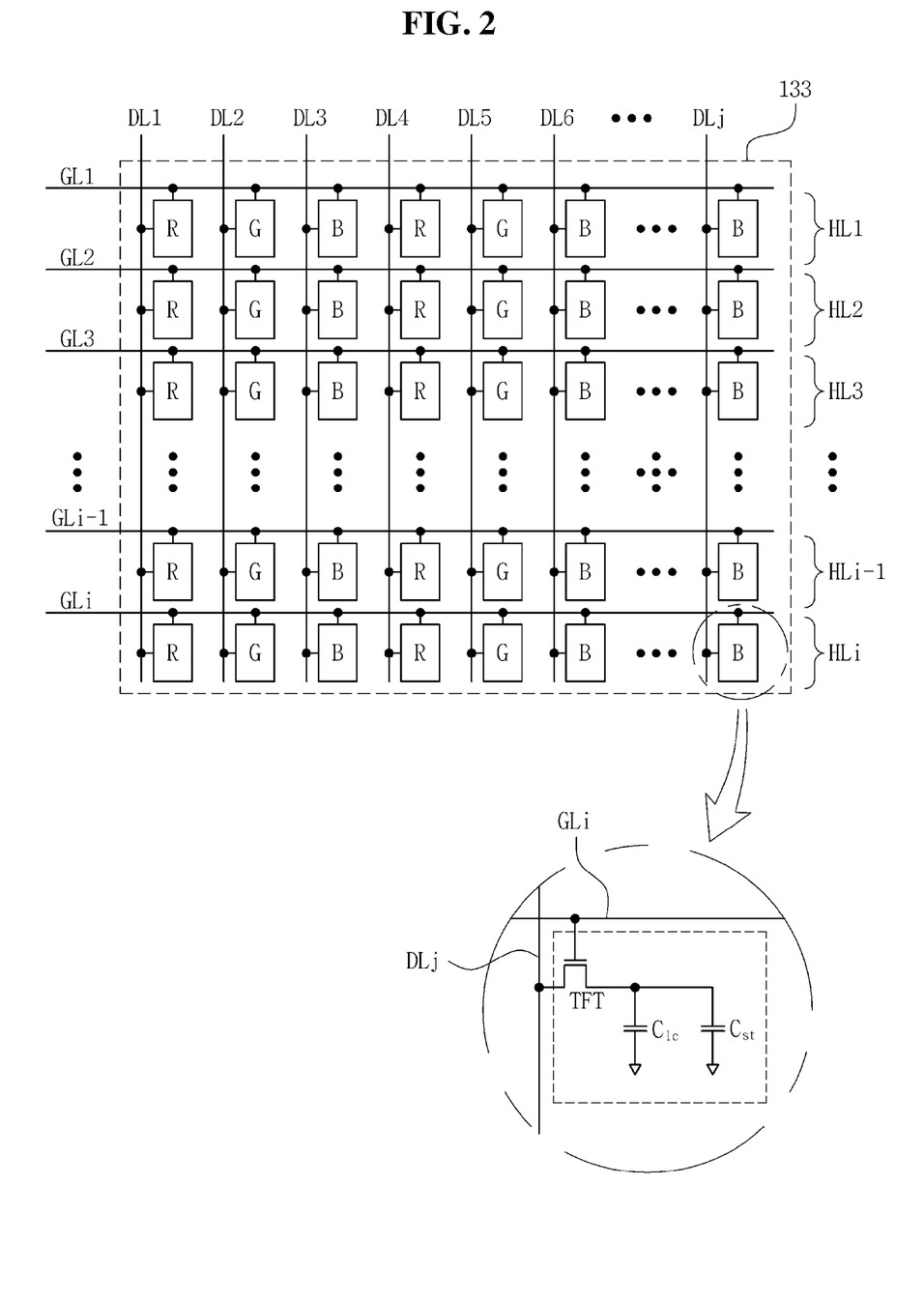
FIG. 2 is a detailed configuration view illustrating a display panel of FIG. 1.

FIG. 1 is a block diagram illustrating a display device according to an exemplary embodiment of the present invention; and FIG. 2 is a detailed configuration view illustrating a display panel of FIG. 1.

Referring to FIG. 1, a display device according to an exemplary embodiment may include a display panel 133, a backlight unit 150, a backlight controller 158, a timing controller 101, a gate driver 112, a data driver 111, and a direct current (DC)-DC converter 177.

The display panel 133 may display an image. The display panel 133 may include, although not illustrated, a liquid crystal layer and lower and upper substrates opposing one another with the liquid crystal layer interposed therebetween. The display panel 133 may be a curved display panel.

On the lower substrate, a plurality of gate lines GL1 through GLi, a plurality of data lines DL1 through DLj intersecting the gate lines GL1 through GLi, and thin film transistors (TFTs) connected to the gate lines GL1 through GLi and the data lines DL1 through DLj may be disposed.

Although not illustrated, a black matrix, a plurality of color filters, and a common electrode may be disposed on the upper substrate. The black matrix may be disposed in a portion of the upper substrate other than portions of the upper substrate corresponding to pixel regions. The color filters may be disposed in the pixel regions. The color filters may be classified into red, green, and blue color filters.

Pixels R, G, and B may be arranged in a matrix form. The pixels R, G, and B may be classified into red pixels R disposed corresponding to the red color filter, green pixels G disposed corresponding to the green color filter, and blue pixels B disposed corresponding to the blue color filter. In this case, horizontally adjacent red, green, and blue pixels R, G, and B may form a unit pixel for displaying a single unit image.

There are j pixels (j being a natural number) arranged along an n-th horizontal line (n being one of 1 through i), the j pixels are also referred to as "n-th horizontal line pixels" and may be individually connected to the first through j-th data lines DL1 through DLj, respectively. In addition, the n-th horizontal line pixels may be connected to a common n-th gate line. Accordingly, the n-th horizontal line pixels may receive a common n-th gate signal. That is, all the j pixels arranged along the same horizontal line may receive the same gate signals while other pixels disposed on different horizontal lines may receive different gate signals from one another. For example, a red pixel R and a green pixel G disposed on a first horizontal line HL1 may all receive a first gate signal while a red pixel R and a green pixel G disposed on a second horizontal line HL2 may all receive a second gate signal having a different timing from that of the first signal.

As illustrated in FIG. 2, each of the red, green, and blue pixels R, G, and B may include a TFT, a liquid crystal capacitor Clc, and a storage capacitor Cst. The TFT may be turned on based on a gate signal from the gate line. The turned-on TFT may supply an analog image data signal supplied from the data line to the liquid crystal capacitor Clc and the storage capacitor Cst. The liquid crystal capacitor Clc may include a pixel electrode and a common electrode disposed to oppose one another. The storage capacitor Cst may include a pixel electrode and an opposing electrode disposed to oppose one another. Here, the opposing electrode may be a previous gate line or a common line transmitting a common voltage. Meanwhile, the TFT from among the elements constituting each of the red, green, and blue pixels R, G, and B may be covered by the black matrix.

The timing controller 101 may receive a vertical synchronization signal Vsync, a horizontal synchronization signal Hsync, an image data signal DATA, and a clock signal DCLK output from a graphic controller provided in a system. An interface circuit (not illustrated) may be provided between the timing controller 101 and the system, and the signals output from the system may be input to the timing controller 101 through the interface circuit. The interface circuit may be equipped in the timing controller 101. Although not illustrated, the interface circuit may include a low voltage differential signaling (LVDS) receiver. The interface circuit may decrease levels of voltages of and increase frequencies of the vertical synchronization signal Vsync, the horizontal synchronization signal Hsync, the image data signal DATA, and the clock signal DCLK output from the system. Meanwhile, due to a high-frequency component of the signal input from the interface circuit to the timing controller 101, electromagnetic interference may be caused therebetween. In order to prevent such electromagnetic interference, an electromagnetic interference (EMI) filter (not illustrated) may further be provided between the interface circuit and the timing controller 101.

The timing controller 101 may generate a gate control signal for controlling the gate driver 112 and a data control signal for controlling the data driver 111, using the vertical synchronization signal Vsync, the horizontal synchronization signal Hsync, and the clock signal DCLK. The gate control signal may include a gate start pulse, a gate shift clock, a gate output enable signal, and the like. The data control signal may include a source start pulse, a source shift clock, a source output enable signal, a polarity signal, and the like.

Further, the timing controller 101 may rearrange the image data signals DATA input thereto through the system and may supply the rearranged image data signals DATA' to the data driver 111.

Meanwhile, the timing controller 101 may be operated by a driving power VCC output from a power source unit provided in the system. In particular, the driving power VCC may be used as a power voltage of a phase lock loop PLL equipped in the timing controller 101. The PLL may compare the clock signal DCLK input to the timing controller 101 with a reference frequency generated by an oscillator. In a case in which a difference between the clock signal and the reference frequency is verified as a result of the comparison, the PLL may adjust the frequency of the clock signal by the difference to thereby generate a sampling clock signal. The sampling clock signal may be a signal used to perform sampling of the image data signals DATA'.

The DC-DC converter 177 may increase or decrease a level of the driving power VCC input through the system to thereby generate voltages required for the display panel 133. To this end, the DC-DC converter 177 may include, for example, an output switching element for switching an output voltage of an output terminal thereof, and a pulse width modulator PWM for controlling a duty ratio or a frequency of a control signal applied to a control terminal of the output switching element so as to increase or decrease the level of the output voltage. Here, the DC-DC converter 177 may include a pulse frequency modulator PFM, in lieu of the pulse width modulator PWM.

The pulse width modulator PWM may increase or decrease the level of the output voltage of the DC-DC converter 177 by increasing or decreasing the duty ratio of the above-described control signal. The pulse frequency modulator PFM may increase or decrease the level of the output voltage of the DC-DC converter 177 by increasing or decreasing the frequency of the above-described control signal. The output voltage of the DC-DC converter 177 may include a reference voltage VDD having a level of about 6 volts (V) or more, a gamma reference voltage GMA1-10 of less than level 10, a common voltage having a level in a range from about 2.5 to 3.3V, a gate high voltage having a level of about 15V or more, and a gate low voltage having a level of about −4V or less.

The gamma reference voltage GMA1-10 may be a voltage generated by dividing the reference voltage. The reference voltage and the gamma reference voltage may be analog gamma voltages, and may be supplied to the data driver 111. The common voltage may be supplied to a common electrode of the display panel 133 via the data driver 111. A gate high voltage may be a high logic voltage of the gate signal, which is set to have a level higher than a level of a threshold voltage of the TFT. A gate low voltage may be a low logic voltage of the gate signal, which is set to have a level of an off voltage of the TFT. The gate high voltage and the gate low voltage may be supplied to the gate driver 112.

The gate driver 112 may generate gate signals based on a gate control signal GCS supplied from the timing controller 101 and may sequentially supply the gate signals to the plurality of gate lines GL1 to GLi. The gate driver 112 may include, for example, a shift register generating gate signals by shifting a gate start pulse based on a gate shift clock. The shift register may include a plurality of switching elements. The switching elements may be formed on a front surface of the lower substrate using the same process as that of the TFT of a display region.

The data driver 111 may receive the image data signals DATA' and a data control signal DCS supplied thereto from the timing controller 101. The data driver 111 may perform sampling of the image data signals DATA' based on the data control signal DCS, may perform latching of the sampled image data signals corresponding to a single horizontal line for each horizontal period, and may supply the latched image data signals to the data lines DL1 through DLj, respectively. That is, the data driver 111 may convert the image data signals DATA' supplied from the timing controller 101 into analog image data signals using the gamma reference voltages GMA1-10 input from the DC-DC converter 177 to thereby supply the analog image data signals to the data lines DL1 through DLj, respectively.

The backlight unit 150 may supply light to the display panel 133. The backlight unit 150 may include a backlight 157 emitting light and the backlight controller 158 controlling the backlight 157.

Figure 3:
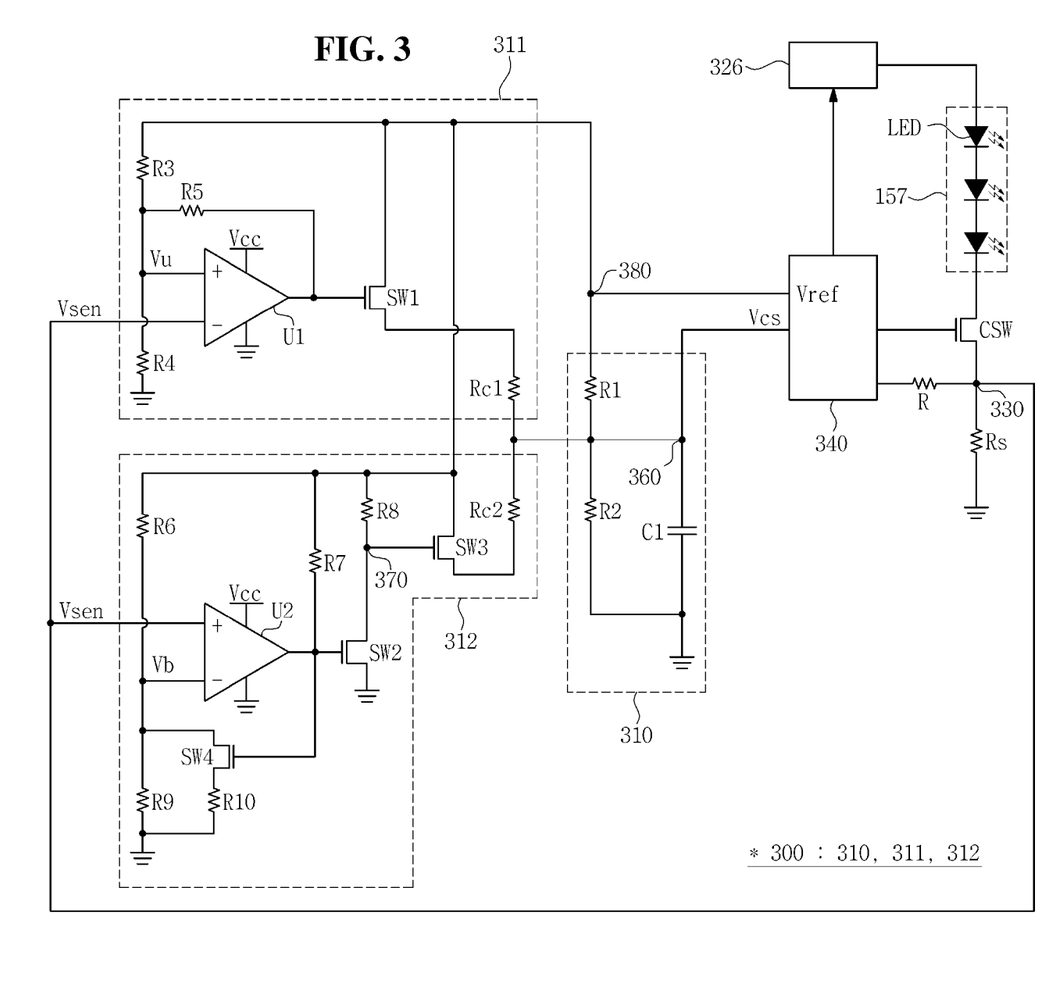
FIG. 3 is a detailed configuration view illustrating an example of a backlight and a backlight controller of FIG. 1.

FIG. 3 is a detailed circuit configuration of an example of a backlight 157 and a backlight controller 158 of FIG. 1.

The backlight 157 may include, as illustrated in FIG. 3, at least a light source LED. The light source LED may be connected between a DC-DC converter 326 used for a backlight 157 and a static current switching element CSW.

The light source LED may emit light by a driving current generated based on a driving voltage from the DC-DC converter 326 used for the backlight 157, and the driving current may be controlled by the backlight controller 158. Meanwhile, when the backlight 157 includes a plurality of light sources LED, the light sources LED may be connected in series to one another between the DC-DC converter 326 and the static current switching element CSW. In this instance, the plurality of light sources LED connected in series are referred to as a light source array.

The light source LED may be a light emitting package including at least a light emitting diode (LED). For example, a single light emitting package may include a red LED emitting red light, a green LED emitting green light, and a blue LED emitting blue light therein. The light emitting package may generate white light through a combination of three types of light having three different colors. As a further example, the light emitting package may only include a blue LED therein from among the above-described three types of LEDs, that is, the red, green, and blue LEDs. In this case, phosphors may be formed in a light emitting unit of the blue LED so as to convert blue light into white light.

The backlight 157 may be one of a direct-type backlight, an edge-type backlight, and a corner-type backlight.

The backlight controller 158 may control luminance of light emitted from the light source LED by adjusting an amount of a driving current flowing through the light source LED.

The backlight controller 158 may include, as illustrated in FIG. 3, the DC-DC converter 326 used for the backlight 157, a light source driving integrated circuit 340, the static current switching element CSW, a plurality of resistors R1 through R10 and R including a sensing resistor Rs, and a driving current corrector 300.

The DC-DC converter 326 used for the backlight 157 may externally receive a power voltage, may change a level of the power voltage, and may generate a driving voltage for driving the light source LED. Here, the DC-DC converter 326 used for the backlight 157 may generate the driving voltage by increasing or decreasing the level of the power voltage. Meanwhile, the DC-DC converter 326 used for the backlight 157 may adjust a level of the driving voltage based on a dimming signal from the light source driving integrated circuit 340.

The static current switching element CSW may be connected between the light source LED and a sensing node 330 and may control the driving current supplied to the light source LED.

The sensing resistor Rs may be connected between the sensing node 330 and a ground. When the driving current flows through the sensing resistor Rs, a sensing voltage Vsen corresponding to the driving current may be generated in the sensing node 330.

The light source driving integrated circuit 340 may control an operation of the static current switching element CSW based on the sensing voltage Vsen from the sensing node 330 and a driving current control signal Vcs from the driving current corrector 300. In addition, the light source driving integrated circuit 340 may control the operation of the static current switching element CSW based on an externally supplied dimming signal.

The driving current corrector 300 may generate the driving current control signal Vcs. In this instance, the driving current corrector 300 may correct a level of the driving current control signal Vcs based on the sensing voltage Vsen.

The driving current corrector 300 may include a control signal generator 310, a first corrector 311, and a second corrector 312.

The control signal generator 310 may receive an input of a reference voltage Vref to thereby generate the driving current control signal Vcs. The reference voltage Vref may be output from the light source driving integrated circuit 340.

The control signal generator 310 may include, for example, a first resistor R1, a second resistor R2, and a first capacitor C1.

The first resistor R1 may be connected between a reference node 380 and an output terminal 360 of the control signal generator 310. The reference voltage Vref from the light source driving integrated circuit 340 may be applied to the reference node 380.

The second resistor R2 may be connected between the output terminal 360 of the control signal generator 310 and a ground.

The first capacitor C1 may be connected between the output terminal 360 of the control signal generator 310 and the ground.

The first corrector 311 may compare a level of the sensing voltage Vsen with a level of a predetermined upper limit reference voltage Vu, and may correct a level of the driving current control signal Vcs output from the control signal generator 310 based on a result of the comparison. Here, the upper limit reference voltage Vu may be a voltage generated by dividing the reference voltage Vref.

The first corrector 311 may include, for example, a first control resistor Rc1, a third resistor R3, a fourth resistor R4, a fifth resistor R5, a first comparator U1, and a first switching element SW1.

One end terminal of the first control resistor Rc1 may be connected to the output terminal 360 of the control signal generator 310.

The third resistor R3 may be connected between a non-inverting input terminal (+) of the first comparator U1 and the reference node 380.

The fourth resistor R4 may be connected between the non-inverting input terminal (+) of the first comparator U1 and a ground.

The fifth resistor R5 may be connected between the non-inverting input terminal (+) of the first comparator U1 and an output terminal of the first comparator U1.

The first comparator U1 may compare the level of the sensing voltage Vsen with the level of the upper limit reference voltage Vu, and may output a first comparison signal based on a result of the comparison. Based on the result of the comparison, the first comparison signal may have a high logic voltage or a lower logic voltage. Meanwhile, an output of the first comparator U1 may be fedback to the non-inverting input terminal (+) of the first comparator U1 through the fifth resistor R5. Accordingly, the level of the upper limit reference voltage Vu may change based on the output of the first comparator U1. That is, the first comparator U1 may have hysteresis characteristics in which the level of the upper limit reference voltage Vu changes based on the output of the first comparator U1.

The sensing voltage Vsen may be input to an inverting input terminal (−) of the first comparator U1, and the upper limit reference voltage Vu may be input to the non-inverting input terminal (+) of the first comparator U1. Conversely, the sensing voltage Vsen may be input to the non-inverting input terminal (+) of the first comparator U1, and the upper limit reference voltage Vu may be input to the inverting input terminal (−) of the first comparator U1. However, in such a converse case, the aforementioned third through fifth resistors R3, R4, and R5 may be connected to the inverting input terminal (−) of the first comparator U1.

When the level of the sensing voltage Vsen is equal to or lower than the level of the upper limit reference voltage Vu, the first comparator U1 may generate an open collector output or an open drain output as the first comparison signal. The open collector output may correspond to the aforementioned high logic voltage. For example, the open collector output may be a reference voltage divided by the third and fifth resistors R3 and R5.

On the other hand, when the level of the sensing voltage Vsen is higher than the level of the upper limit reference voltage Vu, the first comparator U1 may generate a ground output as the first comparison signal. The ground output may correspond to the aforementioned low logic voltage.

The first switching element SW1 may be controlled based on the first comparison signal from the first comparator U1, and may be connected between the reference node 380 and the other end terminal of the first control resistor Rc1. When the first comparison signal is the high logic voltage such as the aforementioned open collector output, the first switching element SW1 receiving the first comparison signal supplied thereto may be turned on. On the other hand, when the first comparison signal is the low logic voltage such as the aforementioned ground output, the first switching element SW1 receiving the first comparison signal supplied thereto may be turned off.

The second corrector 312 may compare the level of the sensing voltage and a level of a predetermined lower limit reference voltage Vb, and may correct a level of the driving current control signal Vcs output from the control signal generator 310 based on a result of the comparison. Here, the lower limit reference voltage Vb may be a voltage generated by dividing the reference voltage Vref.

The second corrector 312 may include, for example, a second control resistor Rc2, a sixth resistor R6, a seventh resistor R7, an eighth resistor R8, a ninth resistor R9, a tenth resistor R10, a second comparator U2, a second switching element SW2, a third switching element SW3, and a fourth switching element SW4.

One end terminal of the second control resistor Rc2 may be connected to the output terminal 360 of the control signal generator 310.

The sixth resistor R6 may be connected between an inverting input terminal (−) of the second comparator U2 and the reference node 380.

The seventh resistor R7 may be connected between the reference node 380 and an output terminal of the second comparator U2.

The eighth resistor R8 may be connected between the reference node 380 and the control node 370.

The ninth resistor R9 may be connected between the inverting input terminal (−) of the second comparator U2 and a ground.

One end terminal of the tenth resistor R10 may be connected to the ground.

The second comparator U2 may compare the level of the sensing voltage Vsen with the level of the lower limit reference voltage Vb, and may output a second comparison signal based on a result of the comparison. Based on the result of the comparison, the second comparison signal may have a high logic voltage or a lower logic voltage. Meanwhile, an output of the second comparator U2 may be fed back to the inverting input terminal (−) of the second comparator U2 through the sixth and seventh resistors R6 and R7. Accordingly, the level of the lower limit reference voltage Vb may change based on the output of the second comparator U2. In addition, the level of the lower limit reference voltage Vb may change as an operation fo the fourth switching element SW4 is controlled based on the output of the second comparator U2. That is, the second comparator U2 may have hysteresis characteristics in which the level of the lower limit reference voltage Vb changes based on the output of the second comparator U2.

The sensing voltage Vsen may be input to a non-inverting input terminal (+) of the second comparator U2, and the lower limit reference voltage Vb may be input to the inverting input terminal (−) of the second comparator U2. Conversely, the sensing voltage Vsen may be input to the inverting input terminal (−) of the second comparator U2, and the lower limit reference voltage Vb may be input to the non-inverting input terminal (+) of the second comparator U2. However, in such a converse case, the aforementioned sixth through tenth resistors R6 through R10 may be connected to the non-inverting input terminal (+) of the second comparator U2.

When the level of the sensing voltage Vsen is equal to or higher than the level of the lower limit reference voltage Vb, the second comparator U2 may generate an open collector output or an open drain output as the second comparison signal. The open collector output may correspond to the aforementioned high logic voltage. For example, the open collector output may be a reference voltage divided by the seventh resistor R7.

On the other hand, when the level of the sensing voltage Vsen is lower than the level of the lower limit reference voltage Vb, the second comparator U2 may generate a ground output as the second comparison signal. The ground output may correspond to the aforementioned low logic voltage.

The second switching element SW2 may be controlled based on the second comparison signal from the second comparator U2, and may be connected between the control node 370 and a ground. When the second comparison signal is the high logic voltage such as the aforementioned open collector output, the second switching element SW2 receiving the second comparison signal supplied thereto may be turned on. On the other hand, when the second comparison signal is the low logic voltage such as the aforementioned ground output, the second switching element SW2 receiving the second comparison signal supplied thereto may be turned off.

The third switching element SW3 may be controlled based on a voltage of the control node 370, and may be connected between the reference node 380 and the other end terminal of the second control resistor Rc2. A level of the voltage of the control node 370 may change based on an operation of the second control resistor Rc2. That is, when the second switching element SW2 is turned on, the control node 370 may be discharged to a ground voltage through the turned-on second switching element SW2. On the other hand, when the second switching element SW2 is turned off, the control node 370 may be charged with a reference voltage divided by the eighth resistor R8. When the control node 370 is discharged, the third switching element SW3 may be turned off, and when the control node 370 is charged, the third switching element SW3 may be turned on. Consequently, when the second comparison signal is the high logic voltage such as the aforementioned open collector output, the third switching element SW3 may be turned off. However, when the second comparison signal is the low logic voltage such as the aforementioned ground output, the third switching element SW3 may be turned on.

The fourth switching element SW4 may be controlled based on the second comparison signal from the second comparator U2, and may be connected between the inverting input terminal (−) of the second comparator U2 and the other end terminal of the tenth resistor R10. When the second comparison signal is the high logic voltage such as the aforementioned open collector output, the third switching element SW3 receiving the second comparison signal supplied thereto may be turned on. On the other hand, when the second comparison signal is the low logic voltage such as the aforementioned ground output, the third switching element SW3 receiving the second comparison signal supplied thereto may be turned off.

A level of the resistor connected to the non-inverting input terminal (+) of the second comparator U2 may change based on the output of the second comparator U2. For example, when the second comparison signal is the high logic voltage such as the aforementioned open collector output, the fourth switching element SW4 may be turned on, and accordingly, the ninth and tenth resistors R9 and R10 having a parallel relationship may be connected to the inverting input terminal (−) of the second comparator U2. On the other hand, when the second comparison signal is the low logic voltage such as the aforementioned ground output, the fourth switching element SW4 may be turned off, and in this case, the ninth resistor R9 may only be connected to the inverting input terminal (−) of the second comparator U2. When the output of the second comparator U2 is the open collector output, a resistor having a relatively low level may be connected to the inverting input terminal (−) of the second comparator U2, and when the output of the second comparator U2 is the ground output, a resistor having a relatively high level may be connected to the inverting input terminal (−) of the second comparator U2.

Hereinafter, an operation of the backlight controller 158 will be described below in detail with reference to FIGS. 4A to 4C.

Figure 4A:
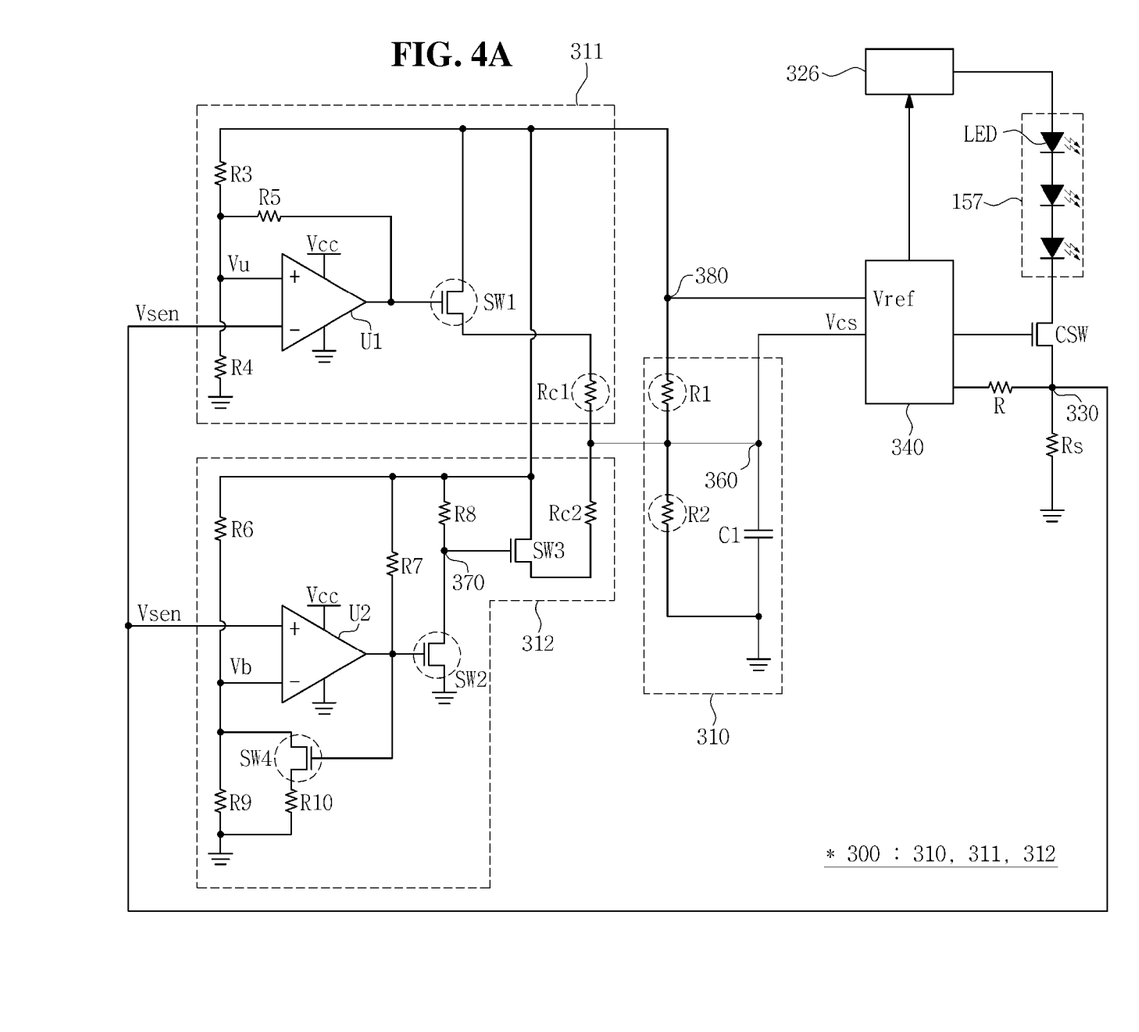
FIGS. 4A through 4C are views illustrating an operation of the backlight controller of FIG. 3.
Figure 4B:
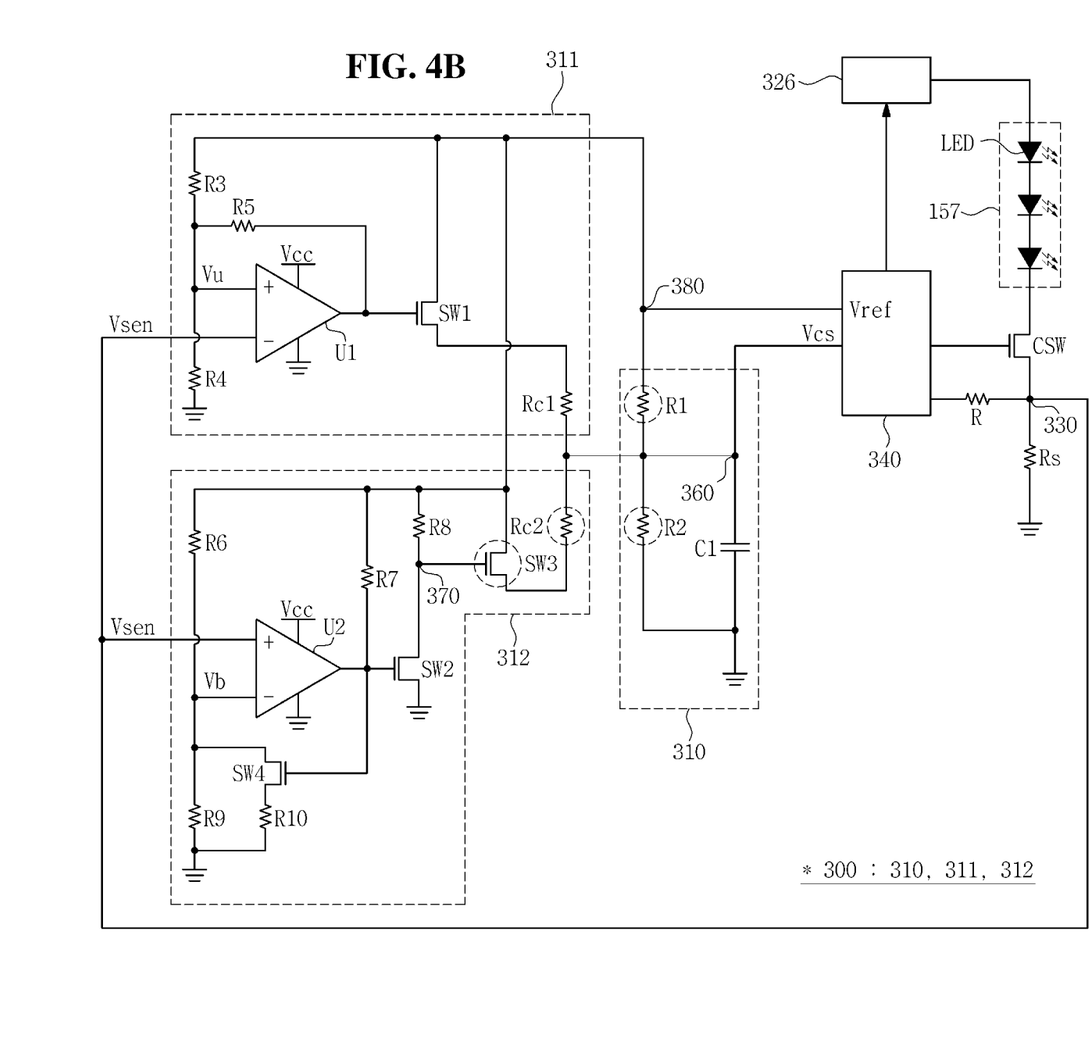
Figure 4C:
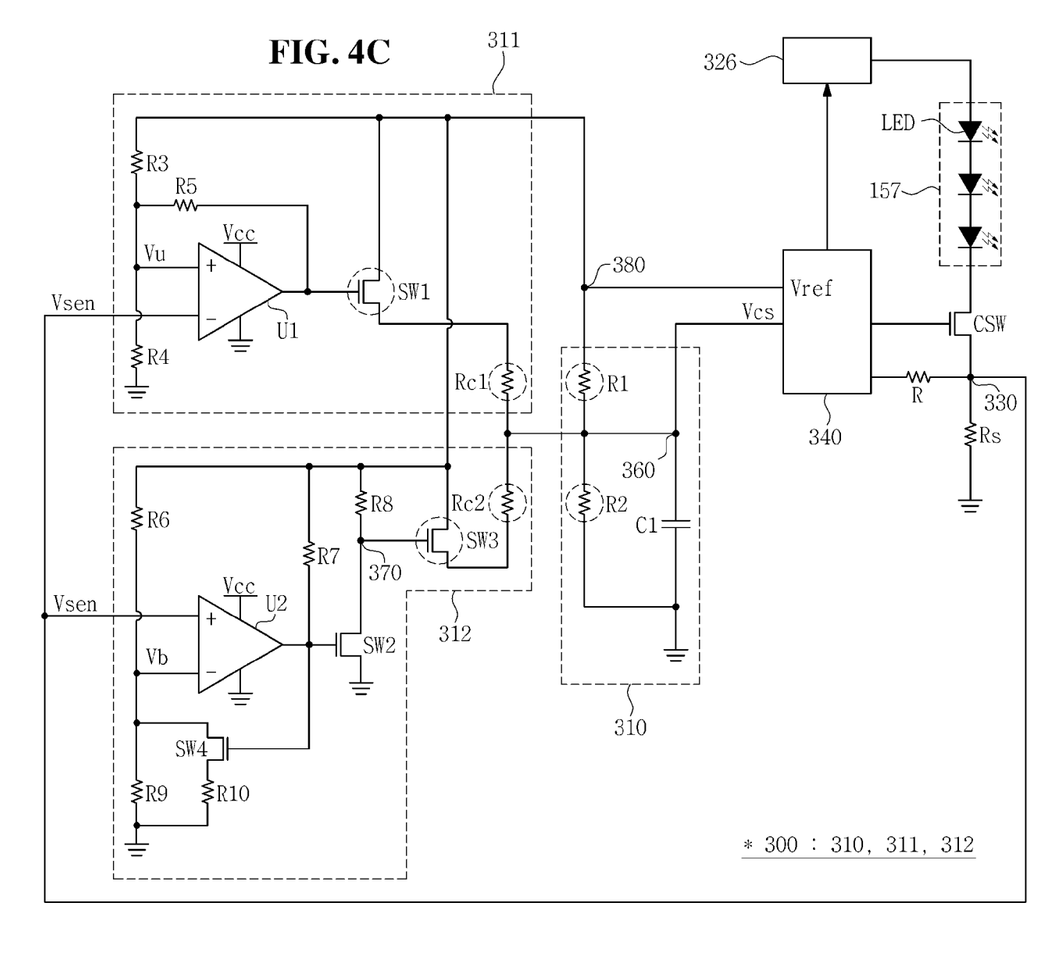

FIGS. 4A through 4C are views illustrating an operation of the backlight controller 158 of FIG. 3. Referring to FIGS. 4A through 4C, a switching element indicated by a dotted circle may be a switching element in a turned-on state, and a resistor indicated by a dotted circle may be a resistor in association with generation of the driving current control signal Vcs.

$$Vb \leq Vsen \leq Vu \qquad \text{[Equation 1]}$$

As represented in Equation 1, in a case in which a level of the sensing voltage Vsen is equal to or higher than a level of the lower limit reference voltage Vb and is equal to or lower than a level of the upper limit reference voltage Vu, a level of the driving current flowing through the light source LED may be within a tolerance range.

Hereinafter, an operation of the backlight controller 158 under the condition as in that of Equation 1 in which the level of the sensing voltage Vsen is equal to or higher than the level of the lower limit reference voltage Vb and is equal to or lower than the level of the upper limit reference voltage Vu will be described with reference to FIG. 4A.

Under the condition as in that of Equation 1, the first comparator U1 may generate the open collector output as the first comparison signal. The first switching element SW1 receiving the open collector output supplied thereto may be turned on, and the first control resistor Rc1 may be connected between the reference node 380 and the output terminal 360 of the control signal generator 310 through the turned-on first switching element SW1.

Under the condition as in that of Equation 1, the second comparator U2 may generate the open collector output as the second comparison signal. The second and fourth switching elements SW2 and SW4 receiving the open collector output supplied thereto may be turned on, and the control node 370 may be discharged by the turned-on second switching element SW2. The third switching element SW3 connected to the discharged control node 370 may be turned off.

Accordingly, when the condition in which the level of the sensing voltage Vsen is equal to or higher than the level of the lower limit reference voltage Vb and is equal to or lower than the level of the upper limit reference voltage Vu is satisfied as in Equation 1, the first control resistor Rc1, the first resistor R1, and the second resistor R2 may be selected. A level of the driving current control signal Vcs may be determined by a time constant calculated based on the selected first control resistor Rc1, the first resistor R1, and the second resistor R2.

$$Vsen > Vu \qquad \text{[Equation 2]}$$

As represented in Equation 2, in a case in which the level of the sensing voltage Vsen is higher than the level of the upper reference voltage Vu, the level of the driving current flowing through the light source LED may deviate from the tolerance range. In this case, since the level of the driving current needs to be decreased so as to be within the tolerance range, the backlight controller 158 may decrease the level of the driving current control signal Vcs.

Hereinafter, an operation of the backlight controller 158 under the condition as in that of Equation 2 in which the level of the sensing voltage Vsen is higher than the level of the upper limit reference voltage Vu will be described with reference to FIG. 4B.

Under the condition as in that of Equation 2, the first comparator U1 may generate the ground output as the first comparison signal. The first switching element SW1 receiving the ground output supplied thereto may be turned off.

Under the condition as in that of Equation 2, the second comparator U2 may generate the open collector output as the second comparison signal. The second and fourth switching elements SW2 and SW4 receiving the open collector output supplied thereto may be turned on, and the control node 370 may be discharged by the turned-on second switching element SW2. The third switching element SW3 connected to the discharged control node 370 may be turned off.

Accordingly, when the condition in which the level of the sensing voltage Vsen is higher than the level of the upper limit reference voltage Vu is satisfied as in Equation 2, neither of the first control resistor Rc1 and the second control resistor Rc2 may be selected. Thus, the level of the driving current control signal Vcs may be determined by a time constant calculated based on the selected first resistor R1, the second resistor R2, and the first capacitor C1. That is, the level of the driving current control signal Vcs may be decreased.

$$Vsen<Vb \qquad \text{[Equation 3]}$$

As represented in Equation 3, in a case in which the level of the sensing voltage Vsen is lower than the level of the lower reference voltage Vb, the level of the driving current flowing through the light source LED may deviate from the tolerance range. In this case, since the level of the driving current needs to be increased so as to be within the tolerance range, the backlight controller 158 may increase the level of the driving current control signal Vcs.

Hereinafter, an operation of the backlight controller 158 under the condition as in that of Equation 3 in which the level of the sensing voltage Vsen is lower than the level of the lower limit reference voltage Vb will be described with reference to FIG. 4C.

Under the condition as in that of Equation 3, the first comparator U1 may generate the open collector output as the first comparison signal. The first switching element SW1 receiving the open collector output supplied thereto may be turned on, and the first control resistor Rc1 may be connected between the reference node 380 and the output terminal of the control signal generator 310 through the turned-on first switching element SW1.

Under the condition as in that of Equation 3, the second comparator U2 may generate the ground output as the second comparison signal. The second and fourth switching elements SW2 and SW4 receiving the ground output supplied thereto may be turned off. As the second switching element SW2 is turned off, the control node 370 may be charged, and the third switching element SW3 connected to the charged control node 370 may be turned on. The second control resistor Rc2 may be connected between the reference node 380 and the output terminal 360 of the control signal generator 310 through the turned-on third switching element SW3.

Accordingly, when the condition in which the level of the sensing voltage Vsen is lower than the level of the upper limit reference voltage Vu is satisfied as in Equation 3, the first control resistor Rc1, the second control resistor Rc2, the first resistor R1, and the second resistor R2 may be selected. The level of the driving current control signal Vcs may be determined by a time constant calculated based on the selected first control resistor Rc1, the second control resistor Rc2, the first resistor R1, the second resistor R2, and the first capacitor C1. That is, the level of the driving current control signal Vcs may be increased.

Figure 5:
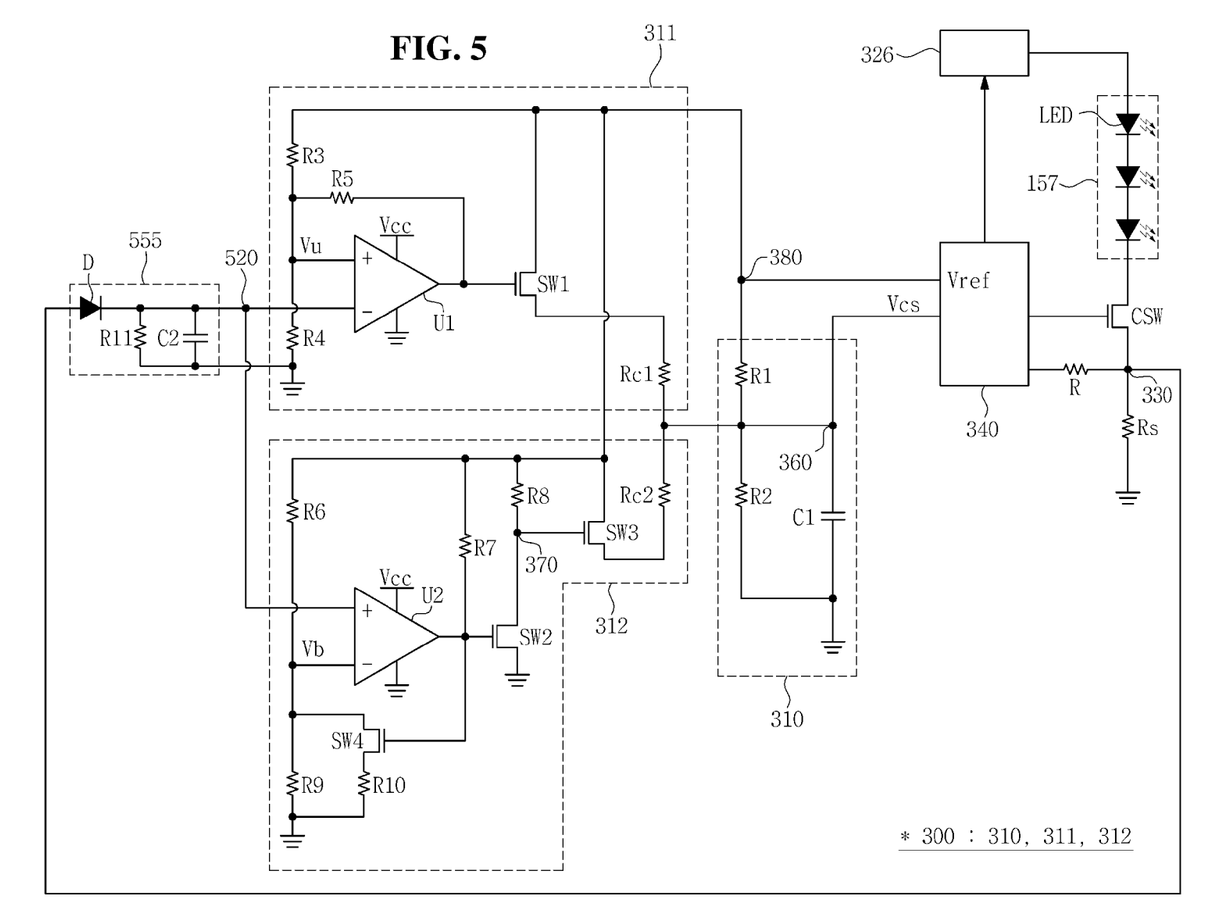
FIG. 5 is a detailed configuration view illustrating another example of the backlight and the backlight controller of FIG. 1.

FIG. 5 is a detailed configuration view illustrating another example of the backlight 157 and the backlight controller 158 of FIG. 1.

A backlight controller 158 illustrated in FIG. 5 may further include an integrator 555, as compared to the backlight controller 158 illustrated in FIG. 1.

The integrator 555 may convert a sensing voltage Vsen into a DC voltage. That is, in a case in which a duty ratio of a driving current is not 100%, the sensing voltage Vsen may have a pulse signal form, and thus, the integrator 555 may convert the sensing voltage Vsen having such a pulse signal form into a signal having a DC form.

The integrator 555 may include a diode D, an eleventh resistor R11, and a second capacitor C2.

The diode D may be connected between the sensing node 330 and an input terminal 520 of the driving current corrector 300. In this instance, an anode terminal of the diode D may be connected to the sensing node 330, and a cathode terminal of the diode D may be connected to the input terminal 520 of the driving current corrector 300. Here, the input terminal 520 of the driving current corrector 300 may correspond to a connection point at which the inverting input terminal (−) of the first comparator U1 and the non-inverting input terminal (+) of the second comparator U2 are connected to one another.

The eleventh resistor R11 may be connected between the input terminal 520 of the driving current corrector 300 and a ground.

The second capacitor C2 may be connected between the input terminal 520 of the driving current corrector 300 and the ground.

Since the other elements in FIG. 5, aside from the integrator 555, are the same as those described with reference to FIG. 3, reference may be made to FIG. 3 for a repeated description thereof.

Figure 6:
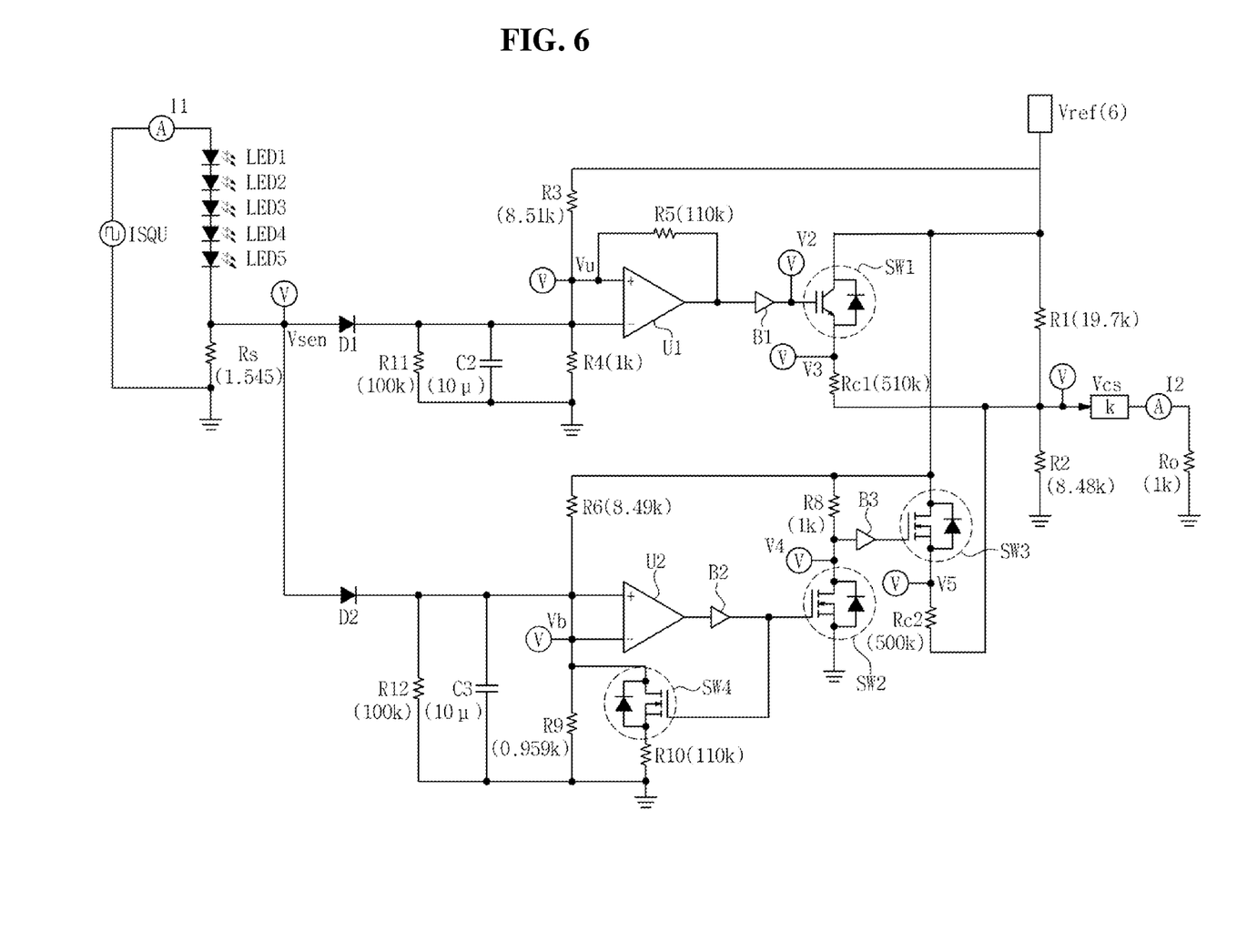
FIG. 6 is a view illustrating a simulation circuit with respect to the backlight and the backlight controller of FIG. 5.

FIG. 6 is a view illustrating a simulation circuit with respect to the backlight 157 and the backlight controller 158 of FIG. 5. Referring to FIG. 6, a numeral provided in brackets beside or below a resistor indicates a resistor level, and a unit of the resistor level is ohm Ω; and a numeral provided in brackets beside or below a capacitor indicates capacity of the capacitor, and a unit of capacity is farad F.

A structure in FIG. 6 may include two integrators, unlike the structure in FIG. 5. One of the integrators may include a first diode D1, an eleventh resistor R11, and a second capacitor C2. Here, the first diode D1 may correspond to the diode D of FIG. 5. Meanwhile, the other integrator may include a second diode D2, a twelfth resistor R12, and a third capacitor C3.

In addition, as illustrated in FIG. 6, a first buffer B1 may further be connected between an output terminal of the first comparator U1 and a gate terminal of a first switching element SW1, and a second buffer B2 may further be connected between the second comparator U2 and a gate terminal of a second switching element SW2.

In addition, as illustrated in FIG. 6, five light sources LED1, LED2, LED3, LED4, and LED5 may be connected in series, and the light sources LED1, LED2, LED3, LED4, and LED5 may be driven by a driving current I1 generated by a square wave generator ISQU.

Figure 7:
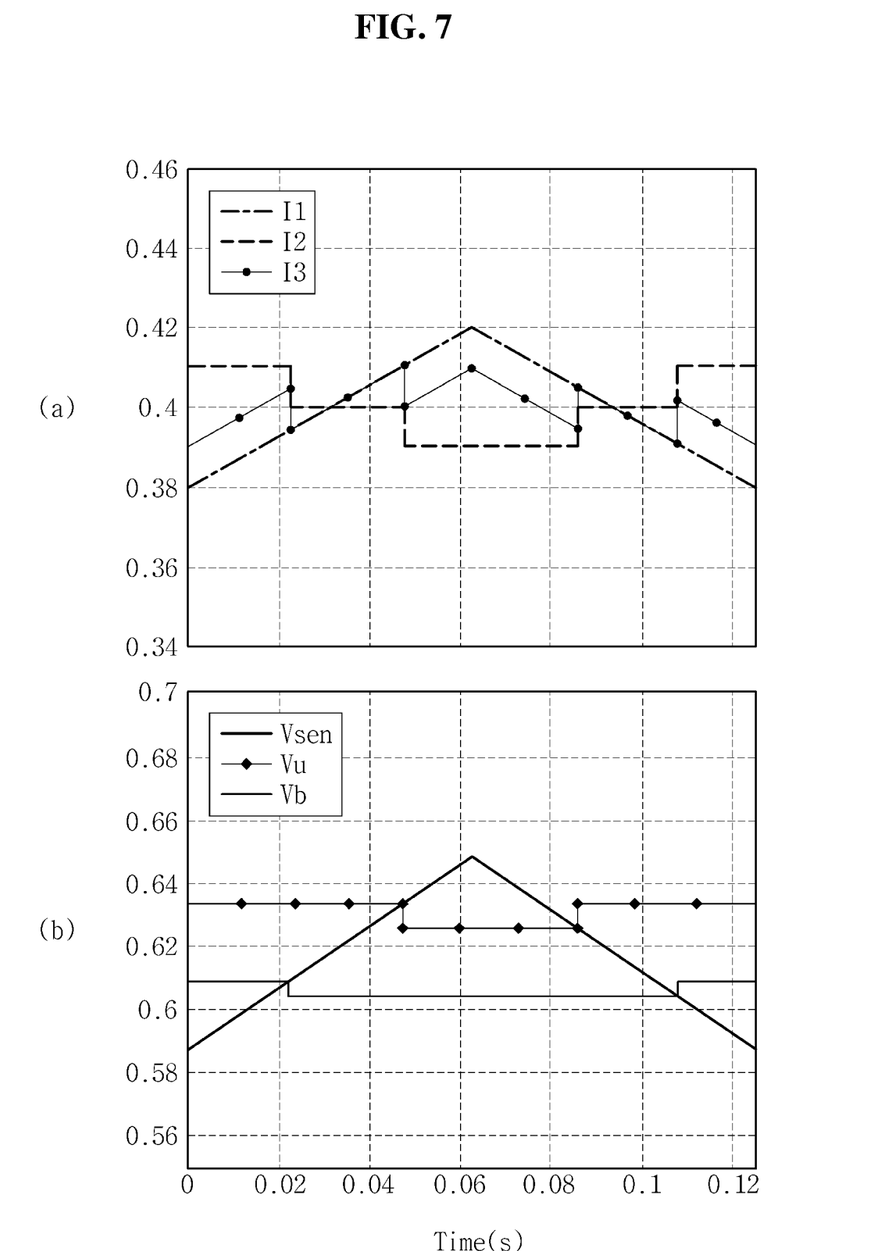
FIG. 7 is a view illustrating a change in levels of a driving current, an upper limit reference voltage, and a lower limit reference voltage obtained as a result of driving the simulation circuit of FIG. 6.

FIG. 7 is a view illustrating a change in levels of a driving current, an upper limit reference voltage, and a lower limit reference voltage obtained as a result of driving the simulation circuit of FIG. 6. Referring to FIG. 7, an X axis indicates time, and a Y axis indicates a level of a driving current. As used herein, a unit of the Y axis is ampere (A).

As illustrated in (a) of FIG. 7, when a target level of a driving current to be supplied to the light sources LED1, LED2, LED3, LED4, and LED5 is 400 milliamperes (mA), a level of the driving current may vary within a range from about +5% to −5% based on the target level. For example, the level of the driving current may be increased to 420 mA or decreased to 380 mA. As such, in a case in which the level of the driving current deviates from a tolerance range, the driving current corrector 300 may substantially reduce a fluctuation in the level of the driving current using a first control resistor Rc1 and a second control resistor Rc2. A detailed description thereof will be provided hereinafter. Currents generated by the first control resistor Rc1 and the second control resistor Rc2 may be defined as a compensation current I2. When the level of the driving current I1 is lower than the target level, a level of the compensation current I2 may be increased to be higher than the target level to thereby increase the level of the driving current I1. On the other hand, when the level of the driving current I1 is higher than the target level, the level of the compensation current I2 may be decreased to be lower than the target level to thereby decrease the level of the driving current I1. Accordingly, the level of the driving current I1 may be corrected so as to be within the tolerance range. That is, as reference numeral I3 designated in FIG. 7A indicates the corrected driving current, it may be appreciated that a level of the corrected driving current I3 varies within a range from about +2.5% to −2.5% based on the target level. That is, a fluctuation range of the level of the driving current I1 is 5% while a fluctuation range of the level of the corrected driving current I3 may be 2.5%. In this regard, it may be appreciated that the fluctuation range of the level of the corrected driving current I3 may be smaller than the fluctuation range of the level of the driving current I1.

As illustrated in (b) of FIG. 7, a level of a sensing voltage Vsen may change corresponding to the level of the driving current I1. In this instance, when the level of the sensing voltage Vsen is increased to be higher or decreased to be lower than a level of a lower limit reference voltage Vb, the level of the lower limit reference voltage Vb may change corresponding to such a change in the level of the sensing voltage Vsen. That is, in a case in which the level of the sensing voltage Vsen is in an increase, the level of the lower limit reference voltage Vb may be decreased therefrom. On the other hand, in a case in which the level of the sensing voltage Vsen is in a decrease, the level of the lower limit reference voltage Vb may be increased therefrom. Similarly, when the level of the sensing voltage Vsen is increased to be higher or decreased to be lower than the level of the upper reference voltage Vu, the level of the lower limit reference voltage Vb may change corresponding to such a change in the level of the sensing voltage Vsen. That is, in a case in which the level of the sensing voltage Vsen is in an increase, the level of the upper limit reference voltage Vu may be decreased therefrom. On the other hand, in a case in which the level of the sensing voltage Vsen is in a decrease, the level of the upper limit reference voltage Vu may be increased therefrom.

Meanwhile, the backlight controller 158 according to the exemplary embodiment may include two or more light source driving integrated circuits 340, and accordingly, the light source driving integrated circuits 340 may each employ a single channel scheme or a multi-channel scheme.

In addition, in lieu of the integrator 555, a compensation circuit (not illustrated) may further be added. The compensation circuit may change the level of the upper limit reference voltage Vu and the level of the lower limit reference voltage Vb based on a pulse width modulation (PWM) signal or an analog dimming signal, which are externally supplied. To this end, the compensation circuit may include a lookup table in which the upper limit reference voltage Vu and the lower limit reference voltage Vb based on a level of the pulse width modulation (PWM) signal or a level of the analog dimming signal are stored.

As set forth above, according to exemplary embodiments of the present invention, the backlight unit may detect a change in a level of a driving current in real time, and may automatically correct a level of a resistor based on a result of the detection. Accordingly, labor force and time required for rework may be saved. In addition, a change in a level of the driving current occurring subsequently to the rework may be corrected.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the invention.

What is claimed is:

1. A backlight unit comprising:
a light source;
a static current switching element connected between the light source and a sensing node and controlling a driving current supplied to the light source;
a sensing resistor connected between the sensing node and a ground;
a static current controller controlling an operation of the static current switching element based on a sensing voltage from the sensing node and an externally supplied driving current control signal; and
a driving current corrector generating the driving current control signal and correcting a level of the driving current control signal based on the sensing voltage,
wherein the driving current corrector includes:
a control signal generator receiving an external input of a reference voltage and generating the driving current control signal;
a first corrector comparing a level of the sensing voltage with a level of an upper limit reference voltage, and correcting a level of the driving current control signal output from the control signal generator based on a result of the comparison; and
a second corrector comparing the level of the sensing voltage with a level of a lower limit reference voltage, and correcting a level of the driving current control signal output from the control signal generator based on a result of the comparison.

2. The backlight unit of claim 1, wherein the control signal generator includes:
   a first resistor connected between a reference node to which the reference voltage is applied and an output terminal of the control signal generator;
   a second resistor connected between the output terminal of the control signal generator and a ground; and
   a first capacitor connected between the output terminal of the control signal generator and the ground.

3. The backlight unit of claim 1, wherein the first corrector includes:
   a first control resistor connected to the output terminal of the control signal generator;
   a first comparator comparing the level of the sensing voltage with the level of the upper limit reference voltage, and outputting a first comparison signal based on a result of the comparison; and
   a first switching element controlled based on the first comparison signal from the first comparator, and connected between a reference node to which the reference voltage is applied and the first control resistor.

4. The backlight unit of claim 3, wherein the first corrector further includes:
   a third resistor connected between an one end input terminal of the first comparator to which the upper limit reference voltage is applied and the reference node; and
   a fourth resistor connected between the one end input terminal of the first comparator and a ground.

5. The backlight unit of claim 3, wherein the first corrector further includes a fifth resistor connected between the one end input terminal of the first comparator to which the upper limit reference voltage is applied and an output terminal of the first comparator.

6. The backlight unit of claim 1, wherein the second corrector includes:
   a second control resistor connected to the output terminal of the control signal generator;
   a second comparator comparing the level of the sensing voltage with the level of the lower limit voltage, and outputting a second comparison signal based on a result of the comparison;
   a second switching element controlled based on the second comparison signal from the second comparator, and connected between a control node and a ground; and
   a third switching element controlled based on a voltage of the control node, and connected between the reference node and the second control resistor.

7. The backlight unit of claim 6, wherein the second corrector further includes:
   a sixth resistor connected between an one end input terminal of the second comparator to which the lower limit reference voltage is applied and the reference node;
   a seventh resistor connected between the reference node and an output terminal of the second comparator; and
   an eighth resistor connected between the reference node and the control node.

8. The backlight unit of claim 6, wherein the second corrector further includes:
   a ninth resistor connected between the one end input terminal of the second comparator and a ground;
   a tenth resistor connected to the ground; and
   a fourth switching element controlled based on the second comparison signal from the second comparator, and connected between the one end terminal of the second comparator and the tenth resistor.

9. A backlight unit comprising:
   a light source;
   a static current switching element connected between the light source and a sensing node and controlling a driving current supplied to the light source;
   a sensing resistor connected between the sensing node and a ground;
   a static current controller controlling an operation of the static current switching element based on a sensing voltage from the sensing node and an externally supplied driving current control signal;
   a driving current corrector generating the driving current control signal and correcting a level of the driving current control signal based on the sensing voltage; and
   an integrator connected between the sensing node and the driving current corrector.

10. The backlight unit of claim 9, wherein the integrator includes:
   a diode connected between the sensing node and an input terminal of the driving current corrector;
   an eleventh resistor connected between the input terminal of the driving current corrector and a ground; and
   a second capacitor connected between the input terminal of the driving current corrector and the ground.

* * * * *